United States Patent
Ho et al.

(10) Patent No.: US 8,605,833 B2
(45) Date of Patent: Dec. 10, 2013

(54) SIGNAL PROCESSING APPARATUS AND METHOD THEREOF

(75) Inventors: Tien-Hsin Ho, Hsinchu Hsien (TW); Shao Ping Hung, Hsinchu Hsien (TW); Tai Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 421 days.

(21) Appl. No.: 12/979,755

(22) Filed: Dec. 28, 2010

(65) Prior Publication Data

US 2011/0161028 A1   Jun. 30, 2011

(30) Foreign Application Priority Data

Dec. 28, 2009  (TW) .............................. 98145337 A (51) Int. Cl.
*H03D 1/00* (2006.01)

(52) U.S. Cl.
USPC ...... 375/343; 375/143; 375/152; 375/E1.018; 708/314

(58) Field of Classification Search
USPC ............. 375/343, 143, 152, E1.018; 708/314
See application file for complete search history.

(56) References Cited

U.S. PATENT DOCUMENTS

| | | | | |
|---|---|---|---|---|
| 6,590,947 | B2 * | 7/2003 | Kurihara | 375/343 |
| 2006/0294177 | A1 * | 12/2006 | Rubanovich | 708/650 |

* cited by examiner

*Primary Examiner* — Daniel Washburn
*Assistant Examiner* — Rahel Guarino
(74) *Attorney, Agent, or Firm* — WPAT, PC; Justin King (57) ABSTRACT

A signal processing apparatus for determining whether a receiving signal is a target signal is provided. The apparatus includes: a sampling device for sampling the receiving signal to generate a plurality of sampled values; a first calculation device, coupled to the sampling device, for generating a plurality of first values according to the sampled values and a plurality of reference values; a second calculation device, coupled to the first calculation device, for grouping the first values into a plurality of value groups, respectively calculating the value groups to generate a plurality of second values and generating a determination value by calculating the second values; and a determination device, coupled to the second calculation device, for determining whether the receiving signal is the target signal by comparing the determination value with a threshold value.

15 Claims, 11 Drawing Sheets

SIGNAL PROCESSING APPARATUS AND METHOD THEREOF

CROSS REFERENCE TO RELATED PATENT APPLICATION

This patent application is based on Taiwan, R.O.C. patent application No. 98145337 filed on Dec. 28, 2009.

FIELD OF THE INVENTION

The present invention relates to a signal processing apparatus and associated method, and more particularly to a signal processing apparatus and associated method for determining whether a receiving signal is a target signal.

BACKGROUND OF THE INVENTION

Matched filters as optimal linear filters for maximizing the signal to noise ratio (SNR) of filtered signal in stochastic additive noise, are widely used in signal detection, image processing, and telecommunications. A matched filter performs correlation on a known target signal with an unknown input signal to detect the presence of the target signal in the input signal, and maximizes the signal to noise ratio (SNR) of the output signals. Specifically, a matched filter generally convolves the input signals with a conjugated time-reversed version of the target signal (or a signal parallel to the target signal), and at the time the input signal is parallel to the target signal, the absolute value of the output signal must be a positive number. Therefore, a conventional signal processing system adopting a matched filter for determining whether a receiving signal is a target signal generally comprises at least a matched filter, an absolute value calculation device, and a comparing device for comparing the accumulated absolute value of a series of output values with a predetermined value, so as to determine the receiving signal is identical to the target signal while the accumulated absolute value exceeds the predetermined result.

Figure 1:
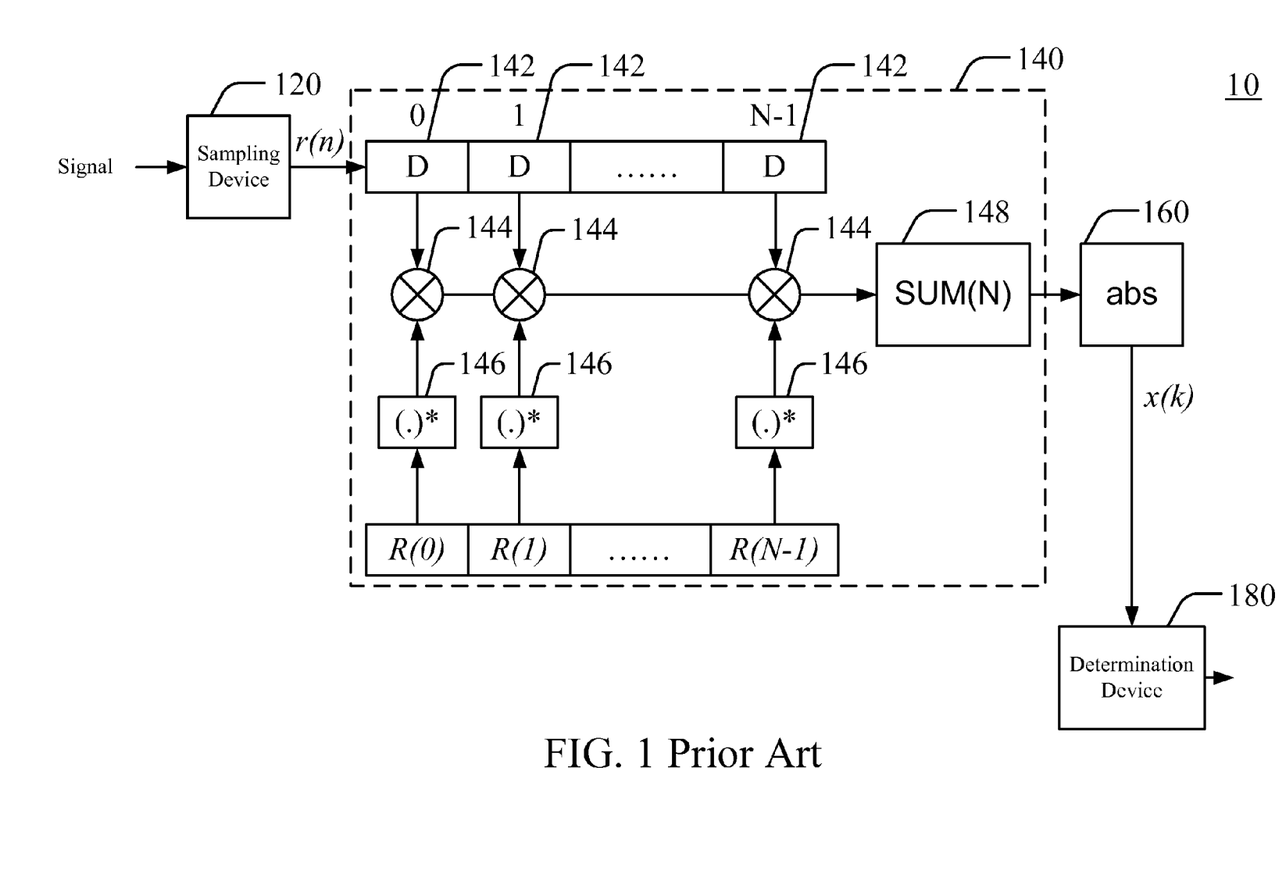
FIG. 1 is a block diagram of a signal processing system of the prior art.

FIG. 1 is a block diagram of a signal processing system 10 of the prior art. The system 10 comprises a sampling device 120, a matched filter 140, an absolute value calculation device 160 and a determination device 180. The matched filter 140 comprises delay units 142, multiplication units 144, conjugation units 146 and an accumulation unit 148.

The sampling device 120 receives an unknown input signal and samples it to generate sampled values r(n), wherein n is a predetermined positive integer number. A plurality of delay units 142 delays the sampled values r(n) to generate delayed sampled values r(n), r(n+1), ..., and r(n+N−1), wherein N is also a predetermined integer number. A plurality of conjugation units 146 conjugate reference values R(n) to generate a plurality of conjugate reference values R*(n), R*(n+1), ..., and R*(n+N−1), wherein R(n) are template signals parallel to the target signal. At that stage, the template signals are an ideal, distorted copy of the target signal. A plurality of multiplication units 144 multiply the delayed sampled values and the conjugate reference values one-to-one to generate r(n)R*(n), r(n+1)R*(n+1), and r(n+N−1)R*(n+N−1). The accumulation unit 148 accumulates r(n)R*(n), r(n+1)R*(n+1), ..., and r(n+N−1)R*(n+N−1) to generate $$\sum_{i=0}^{N-1} r(n+i)R^*(n+i).$$

The absolute value calculation device 160 obtains the absolute value of $$\sum_{i=0}^{N-1} r(n+i)R^*(n+i)$$

to generate accumulated absolute values x(k). The determination device 180 compares the accumulated absolute values x(k) with a threshold value to generate a determination result for determining whether the receiving signal is the target signal. However, such a system cannot eliminate the factor of the strength of the input signal, that is, the value of the accumulated absolute value x(k) is also related to the strength of the input signal. This infers the threshold value must vary according to the strength of the input signal, which is closely related to the circumstances and the way the system is implemented.

Figure 2A:
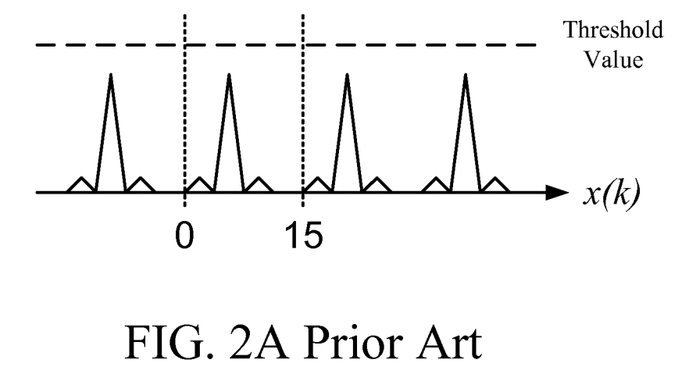
FIG. 2A and FIG. 2B are schematic diagrams of determining whether the receiving signal is the target signal of the prior art.
Figure 2B:
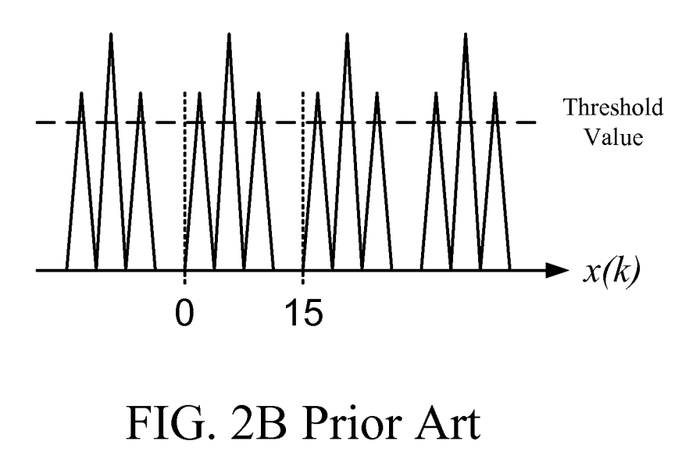

FIG. 2A and FIG. 2B are schematic diagrams of determining whether the receiving signal is the target signal of the prior art. In general, when determining whether the receiving signal is the target signal, comparing the result of the receiving signal undergoing the matched filter operation with the threshold value is performed. When the result of the receiving signal undergoing the matched filter operation is greater than the threshold value, the receiving signal is determined to be the target signal; otherwise, it is determined a non-target signal. When the period of the sampled values r(n) of the signal is 16, i.e. r(n)=r(n+16), the above N is set to be 16. When the receiving signal is the target signal, a larger matched filter result must be generated within one period, as shown in FIG. 2A. However, if the energy of the signal is too low, such as the signal received by the signal processing system 10 being interfered by noise, or the signal processing system 10 being too far away from the transmitting end, even the maximal matched filter result is no greater than the threshold value, such that the receiving signal cannot be determined correctly whether it is the target signal. On the contrary, when the energy of the signal is too high, such as the signal processing system 10 being too close to the transmitting end, or a constructive interference occurring, even if the matched filter results of the non-target signals and the reference value R(n) are not particularly large, the matched filter results may still exceed the threshold value, as shown in FIG. 2B, resulting in incorrectness in determining whether the receiving signal is the target signal.

A good signal processing apparatus must be capable of determining whether the receiving signal is the target signal despite the strength of the receiving signal. However, the prior art utilizes a fixed threshold value to determine different signals, which is inflexible and causes error easily. Hence, there is an urgent need for a signal processing apparatus and associated method for determining whether a receiving signal is a target signal more correctly.

SUMMARY OF THE INVENTION

It is therefore a primary objective of the claimed invention to provide a signal processing apparatus and associated method for determining whether a receiving signal is a target signal more correctly.

The present invention discloses a signal processing apparatus for determining whether a receiving signal is a target signal comprising: a sampling device for sampling the receiving signal to generate a plurality of sampled values; a first calculation device, coupled to the sampling device, for generating a plurality of first values according to the sampled values and a plurality of reference values; a second calculation device, coupled to the first calculation device, for obtaining a plurality of value groups according to the first values, individually calculating the value groups to generate a plurality of second values and calculating the second values to obtain a relative value of the second values as a determination value; and a determination device, coupled to the second calculating device, for comparing the determination value with a threshold value to determine whether the receiving signal is the target signal.

The present invention further discloses a signal processing method for determining whether a receiving signal is a target signal, which comprises sampling the receiving signal to obtain a plurality of sampled values; obtaining a plurality of first values according to the sampled values and a plurality of reference values; obtaining a plurality of value groups according to the first values, and individually calculating the value groups to obtain a relative value of the second values as a plurality of second values; calculating the second values to obtain a determination value; and comparing the determination value with a threshold value to determine whether the receiving signal is the target signal.

The present invention discloses that by calculating the sampled values of the receiving signal within one period according to a plurality of value groups, noise interference in signal transmission, or the problem for variance of signal strength caused by the difference distances between the receiving end and the transmitting end can be resolved by calculating the sampled values according to the value groups and dividing them. Hence, the calculated determination value can reduce the error in determination process. The present invention eliminates the problems in the prior art that the non-target signal is erroneously determined to be the target signal due to the excessive value of the signal strength, or the target signal is omitted because the signal strength is too small.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 3:
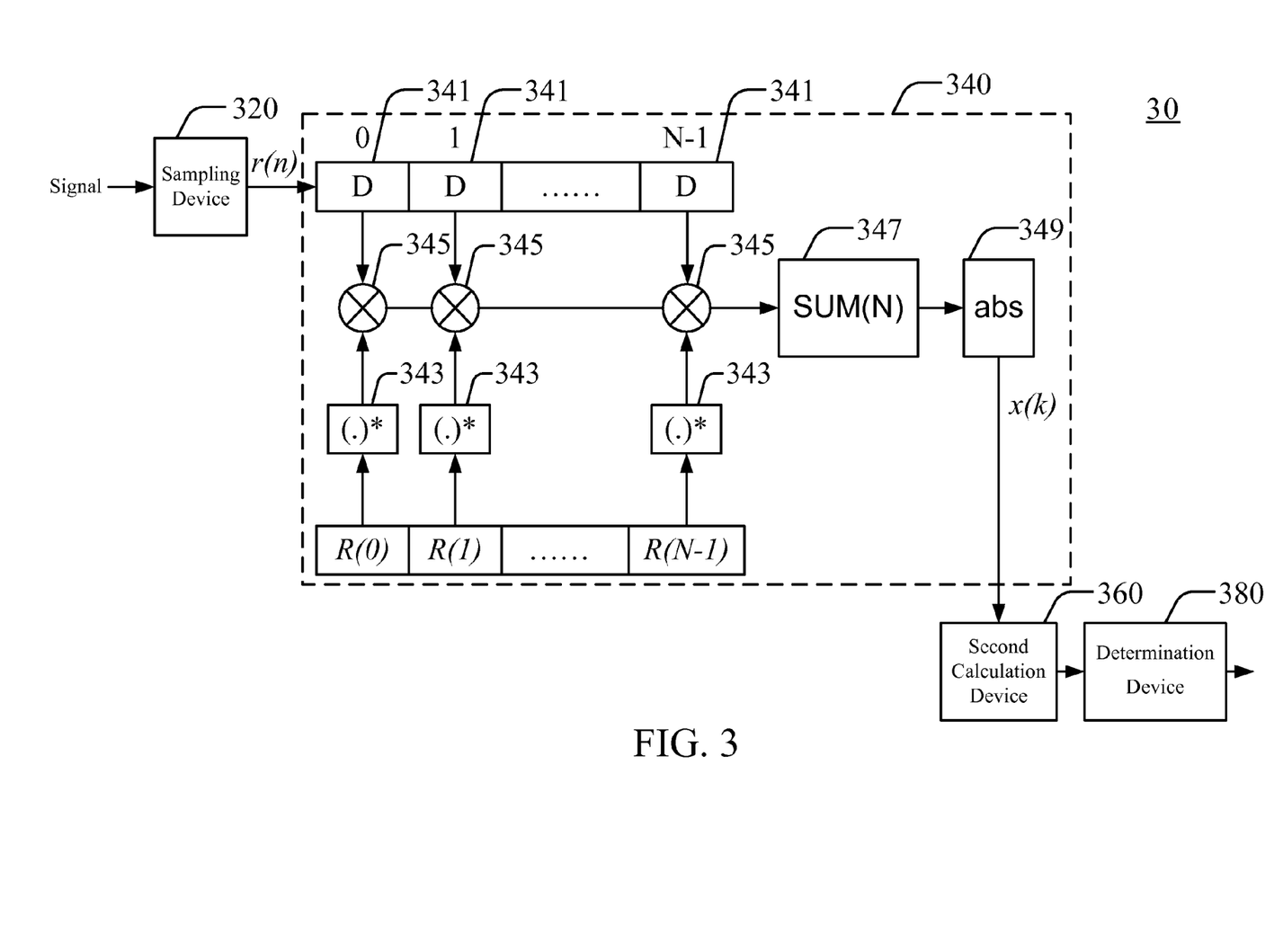
FIG. 3 is a block diagram of a signal processing apparatus according to one embodiment of the present invention.

FIG. 3 is a block diagram of a signal processing apparatus 30 according to one embodiment of the present invention. The apparatus 30 comprises a sampling device 320, a first calculation device 340, a second calculation device 360 and a determination device 380. The first calculation device 340 comprises delay units 341, conjugation units 343, multiplication units 345, an accumulation unit 347 and an absolute value calculation unit 349.

The sampling device 320 samples a signal to generate sampled values r(n), wherein n is a predetermined integer value. A plurality of delay units 341 delays the sampled values r(n) to generate a plurality of delayed sampled values r(n), r(n+1), . . . , and r(n+N−1) wherein N is also a predetermined integer value. The signal may comprise an in-phase signal and a quadrature signal. The sampled values and the delayed sampled values can be complex values. A plurality of conjugation units 343 conjugate reference values R(n) to generate a plurality of conjugate reference values R*(n), R*(n+1), . . . , and R*(n+N−1), wherein R(n) are template signals parallel to the target signal. At that point, the template signals are an ideal, distorted copy of the target signal. The reference values and the conjugate reference values can be complex values. A plurality of multiplication units 345 multiply the sampled values and the conjugate reference values one-to-one to generate a plurality of values r(n)R*(n), r(n+1)R*(n+1), . . . , and r(n+N−1)R*(n+N−1). The accumulation unit 347 accumulates the values r(n)R*(n), r(n+1)R*(n+1), . . . , and r(n+N−1)R*(n+N−1) to generate values $$\sum_{i=0}^{N-1} r(n+i)R^*(n+i).$$

The absolute value calculation unit 349 obtains absolute values of values $$\sum_{i=0}^{N-1} r(n+i)R^*(n+i)$$

to generate values x(k). Detailed operations of the sampling device 320 are well known for those skilled in the art, and are abridged herein.

The second calculation device 360 separates the values x(k) into a plurality of value groups to be individually calculated for generating a plurality of values y(k) and calculates values y(k) to obtain a determination value. The determination device 380 compares the determination value with a threshold value to generate a determination result for indicating whether the receiving signal is a target signal.

Please note that the second calculation device 360 is a general term of the combination of elements and circuits for obtaining the determination value that has eliminated the influence of the value of the signal strength. The details vary according to the application and system realizations. The following descriptions detail the operations of the second calculation device 360 according to an embodiment and the essence of the present invention.

Figure 4:
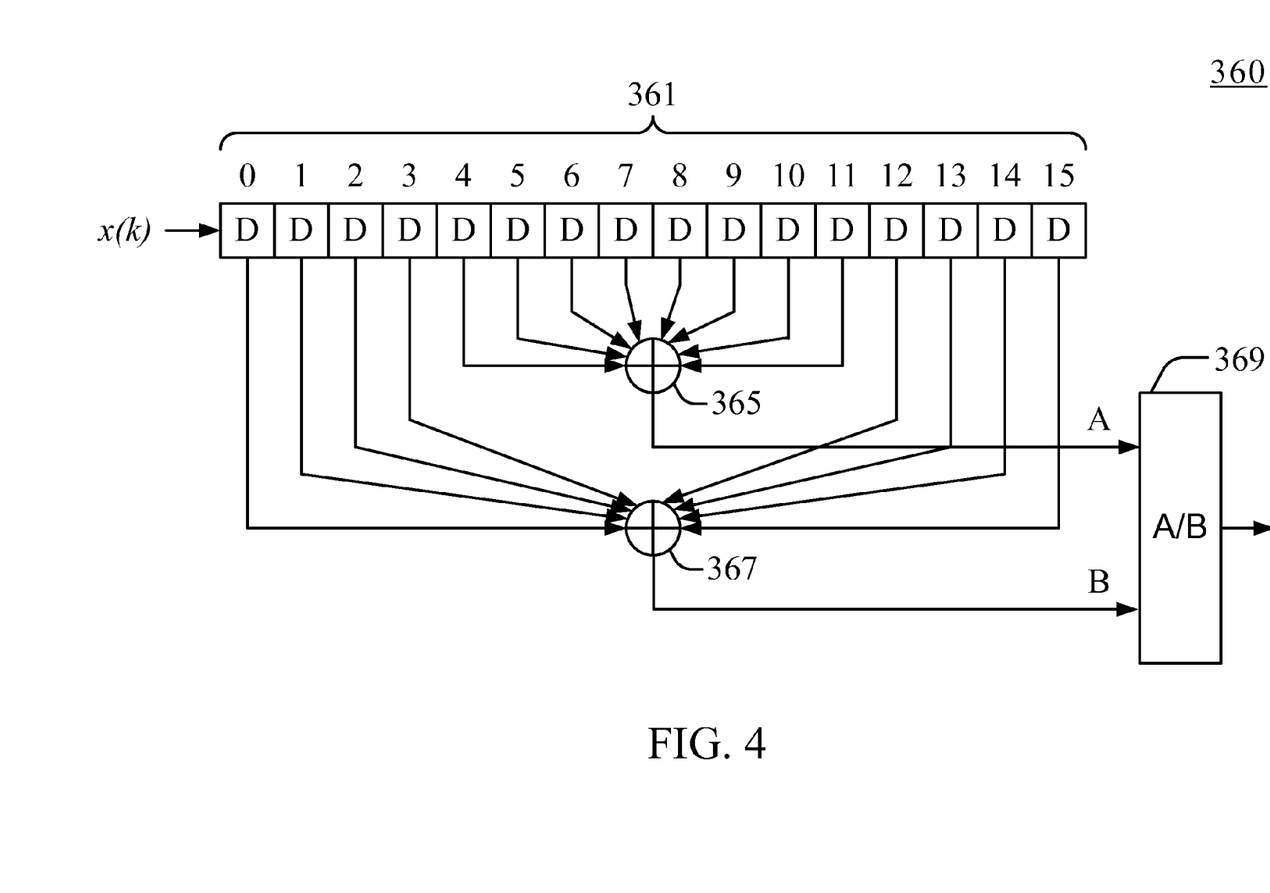
FIG. 4 is a block diagram of the second calculation device 360 according to the above embodiment.

FIG. 4 is a block diagram of the second calculation device 360 according to the above embodiment. The device 360 comprises delay units 361, adding units 365 and 367, and a calculation unit 369. A plurality of delay units 361 delay values x(k) to generate a plurality of delayed values x(k), x(k+1), . . . , and x(k+N−1).

For example, N=16, and the delayed values x(k) are separated into two value groups. The adding unit 365 accumulates the first value group x(k+4), x(k+5), . . . , and x(k+11) to generate a value $$A = \sum_{i=4}^{11} x(k+i).$$

The adding unit 367 accumulates the second value group x(k), x(k+1), x(k+2), x(k+3), x(k+12), x(k+13), x(k+14) and x(k+15) to generate a value $$B = \sum_{i=0}^{3} x(k+i) + \sum_{i=12}^{15} x(k+i).$$

The calculation unit 369 performs calculations using A and B, such as dividing A by B to obtain a determination value A/B. On the contrary, one can divide B by A to get a determination value B/A. Therefore, a plurality of values in this embodiment can be obtained by multiple methods, which is not limited herein. The determination value and the threshold value can be smaller than, equal to or greater than 1, depending on the calculation method.

The essence of the present invention is that although the noise interference in signal transmission or the distances between the receiving end and the transmitting end incurs differentiation in strengths of the receiving signals, in the embodiment, the sampled values of the receiving signal are calculated from a plurality of value groups within the same sampling period, and since the sampled values get larger or smaller simultaneously. The concept of the present invention is obtaining the relative value, as long as there is a relatively maximal value exceeding the threshold value within one period, the receiving signal is determined as the target signal. Therefore, the above problem can be solved by calculating the sampled values according to the value groups and dividing them.

Figure 5A:
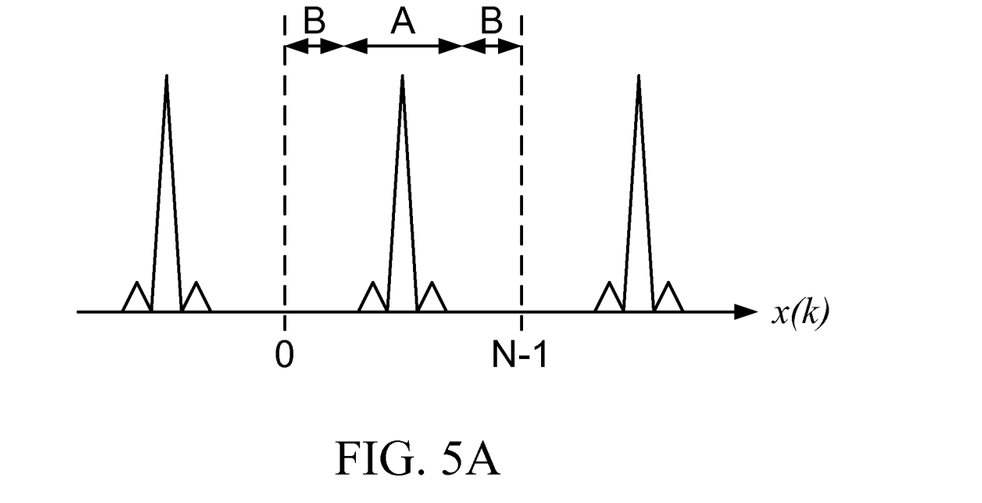
FIG. 5A and FIG. 5B are schematic diagrams of multiple intervals for the values A and B in the above embodiment.
Figure 5B:
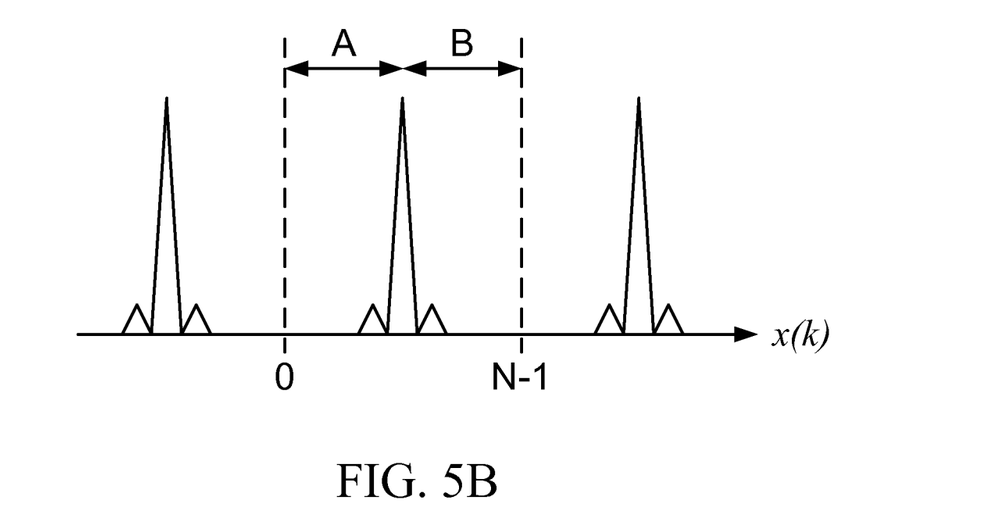

FIG. 5A and FIG. 5B are schematic diagrams of multiple intervals of the values A and B in the above embodiment. For example, FIG. 5A is a schematic diagram of the value selecting method in FIG. 4. In addition, FIG. 5B provides another value group selecting method for $$A = \sum_{i=0}^{7} x(k+i) \text{ and } B = \sum_{i=8}^{15} x(k+i),$$

or the selecting range of values A and B can be reversed, i.e.

$$A = \sum_{i=8}^{15} x(k+i) \text{ and } B = \sum_{i=0}^{7} x(k+i).$$

Figure 10:
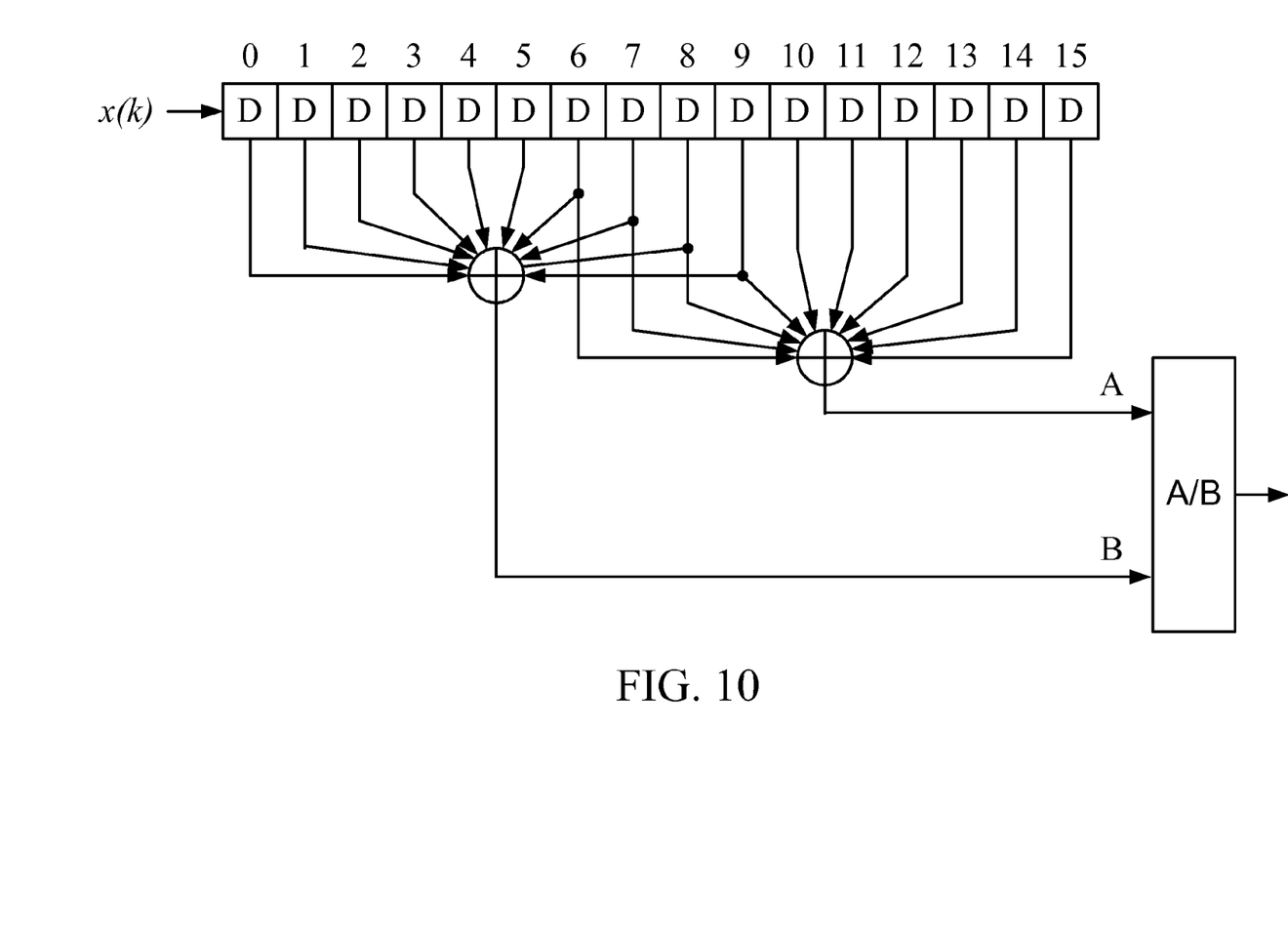
FIG. 10 and FIG. 11 are block diagrams of the second calculating device in the above embodiment.
Figure 11:
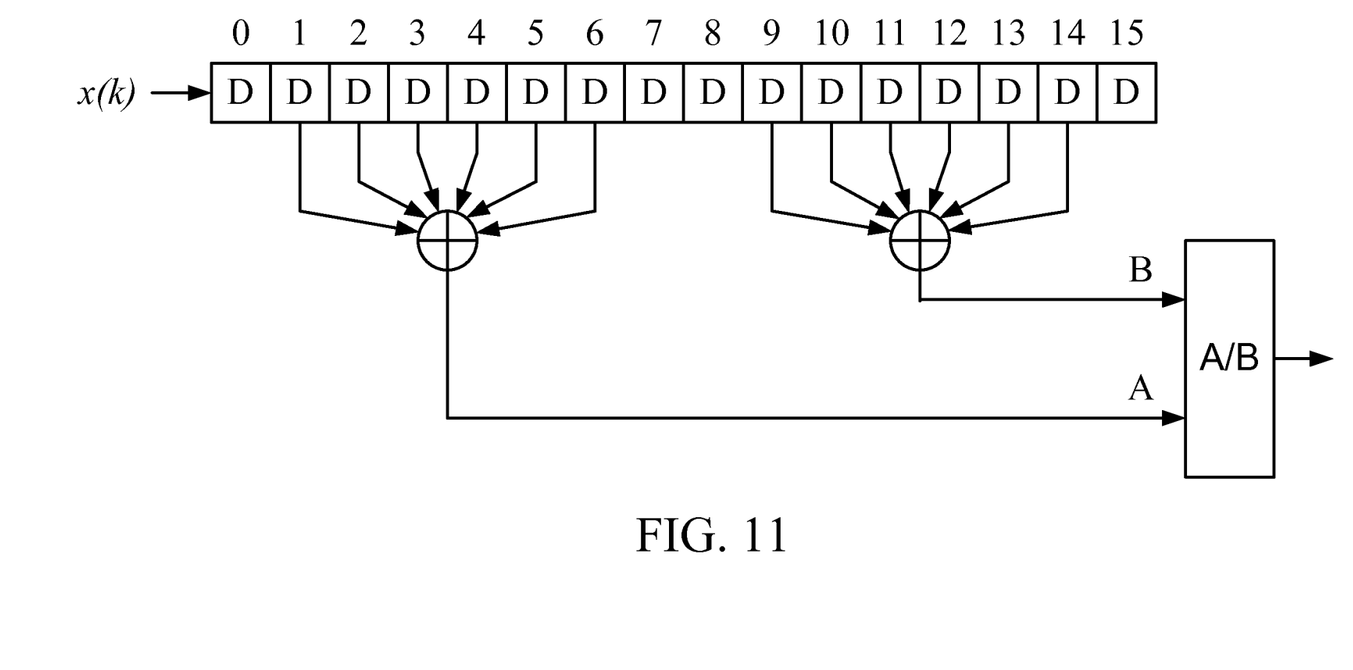

Furthermore, the value groups constituting values A and B can comprise at least one identical value, such as $$A = \sum_{i=6}^{15} x(k+i) \text{ and } B = \sum_{i=0}^{9} x(k+i),$$

as shown in FIG. 10, or abandoning some values to save the hardware cost, such as to save the number of bits for the adding unit, such as $$A = \sum_{i=1}^{6} x(k+i) \text{ and } B = \sum_{i=9}^{14} x(k+i),$$

as shown in FIG. 11. Since the receiving signal can be received anytime, the adding units 365 and 367 can select among the delayed values x(k) arbitrarily within one period N respectively depending on the situation to form two value groups and accumulate the selected values respectively, i.e. the adding units 365 and 367 can select any of the delay units 361 for coupling.

Please note that the major function of first calculation device 340 in FIG. 3 is convolving the first values with a conjugated target signal, or a signal parallel to the target signal, to obtain a plurality of value groups, and the deviated variations or modifications are all within the scope of the present invention. The details of the operations according to three embodiments are as follows.

Figure 6:
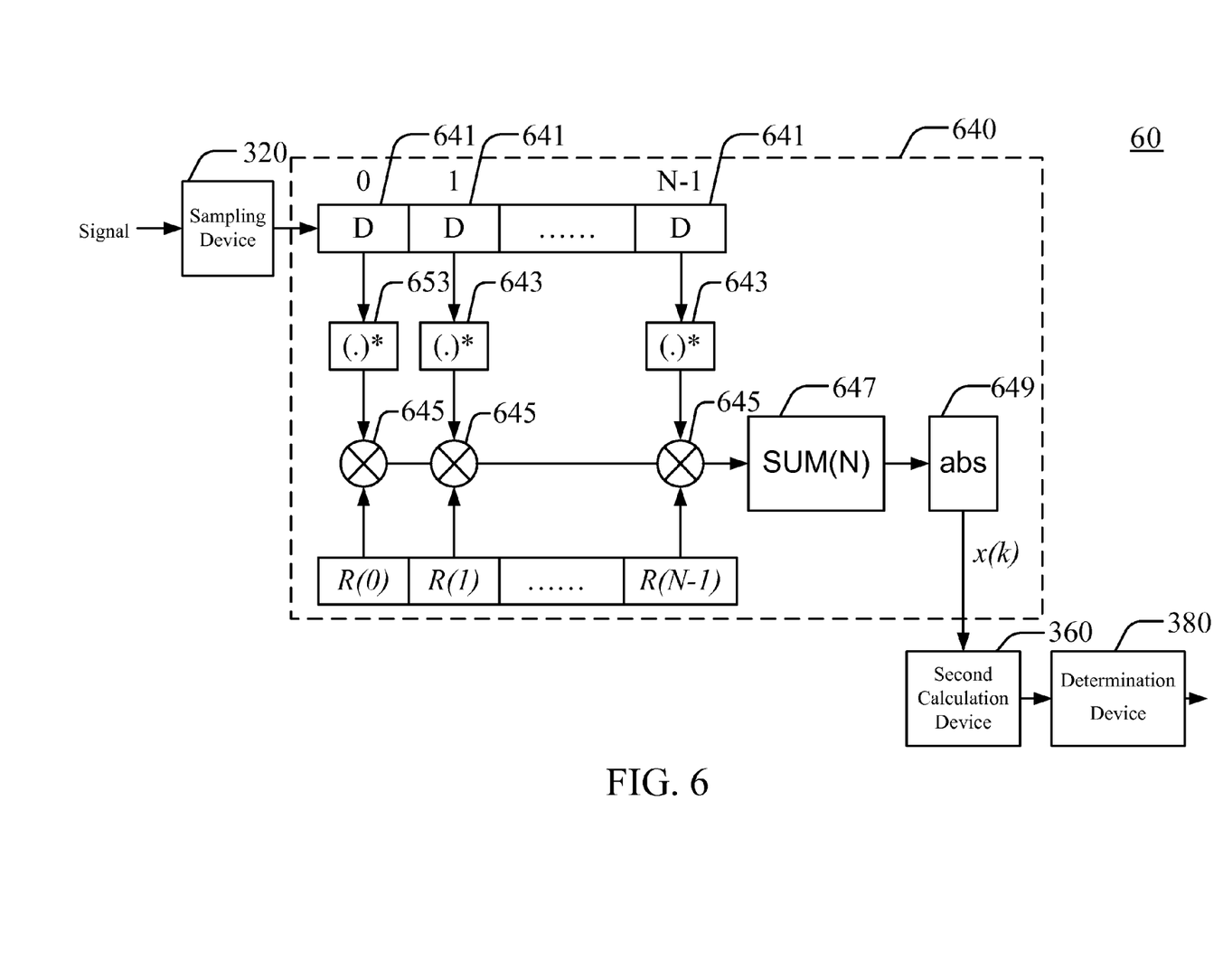
FIG. 6 is a block diagram of a signal processing device according to a second embodiment of the present invention.

FIG. 6 is a block diagram of a signal processing apparatus 60 according to a second embodiment of the present invention. The apparatus 60 comprises the sampling device 320, a first calculation device 640, the second calculation device 360 and the determination device 380. The first calculation device 640 comprises delay units 641, conjugation units 643, multiplication units 645, an accumulation unit 647 and an absolute value calculation unit 649. Only the first calculating device 640 is different from the above description and the details are described as follows. The remainder of the signal processing apparatus components, including sampling device 320, the second calculation device 360 and the determination 380 are similar to the above description, and is abridged herein.

A plurality of delay units, such as delay units 641, delay the sampled values r(n) to generate r(n), r(n+1), . . . , and r(n+N−1). A plurality of conjugation units, such as the conjugation units 643, conjugate the delayed sampled values r(n), r(n+1), . . . , and r(n+N−1) to generate a plurality of conjugate delayed sampled values r*(n), r*(n+1), . . . , and r*(n+N−1).

A plurality of multiplication units, such as multiplication units 645, multiply conjugate delayed sampled values and the reference values one-to-one to generate a plurality of values r*(n)R(n), r*(n+1)R(n+1), and r*(n+N−1)R(n+N−1). The accumulation unit 647 accumulates the values r*(n)R(n), r*(n+1)R(n+1), . . . , and r*(n+N−1)R(n+N−1) to generate values $$\sum_{i=0}^{N-1} r^*(n+i)R(n+i).$$

the absolute value calculation unit 649 uses absolute values of the values $$\sum_{i=0}^{N-1} r^*(n+i)R(n+i)$$

to generate values x(k).

Figure 7:
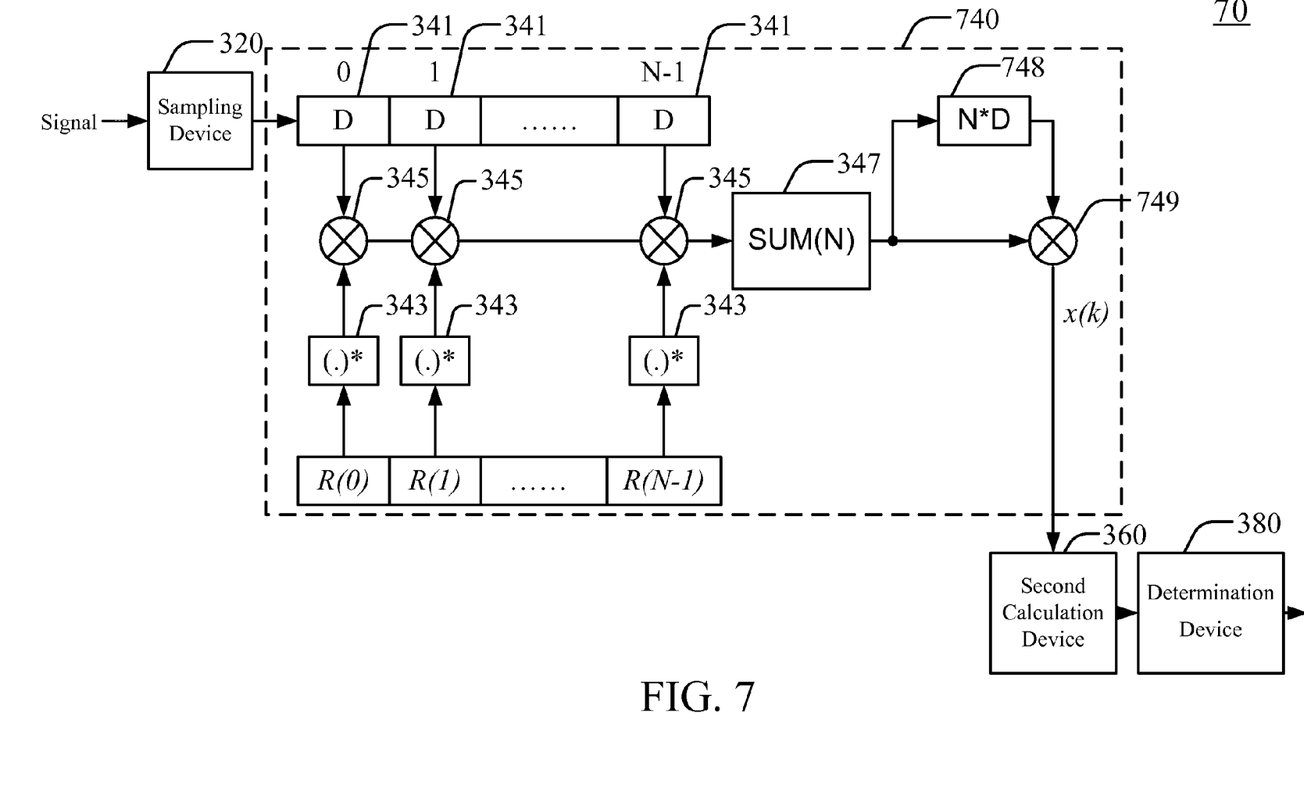
FIG. 7 is a block diagram of a signal processing device according to a third embodiment of the present invention.

FIG. 7 is a block diagram of a signal processing apparatus 70 according to a third embodiment of the present invention. The apparatus 70 comprises the sampling device 320, a first calculating device 740, the second calculation device 360 and the determination device 380. The first calculating device 740 comprises delay units 341, conjugation units 343, multiplication units 345, accumulation unit 347, a delay unit 748 and a multiplication unit 749. Only the delay unit 748 and the multiplication unit 749 in the first calculating device 740 are different from the above description and the details are described as follows. The remainder of the signal processing apparatus components, including sampling device 320, the delay units 341 in the first calculating device 740, the conjugation units 343, the multiplication units 345, the accumulation unit 347, the second calculation device 360 and the determination 380 are similar to the above description, and is abridged herein.

The delayer 748 delays the values $$\sum_{i=0}^{N-1} r^*(n+i)R(n+i)$$

to generate delayed values $$\sum_{i=0}^{N-1} r(n+N+i)R^*(n+N+i).$$

The multiplication unit 749 multiplies $$\sum_{i=0}^{N-1} r(n+i)R^*(n+i) \text{ and } \sum_{i=0}^{N-1} r(n+N+i)R^*(n+N+i)$$

to generate values $$x(k) = \left(\sum_{i=0}^{N-1} r(n+i)R^*(n+i)\right)\left(\sum_{i=0}^{N-1} r(n+N+i)R^*(n+N+i)\right).$$

Figure 8:
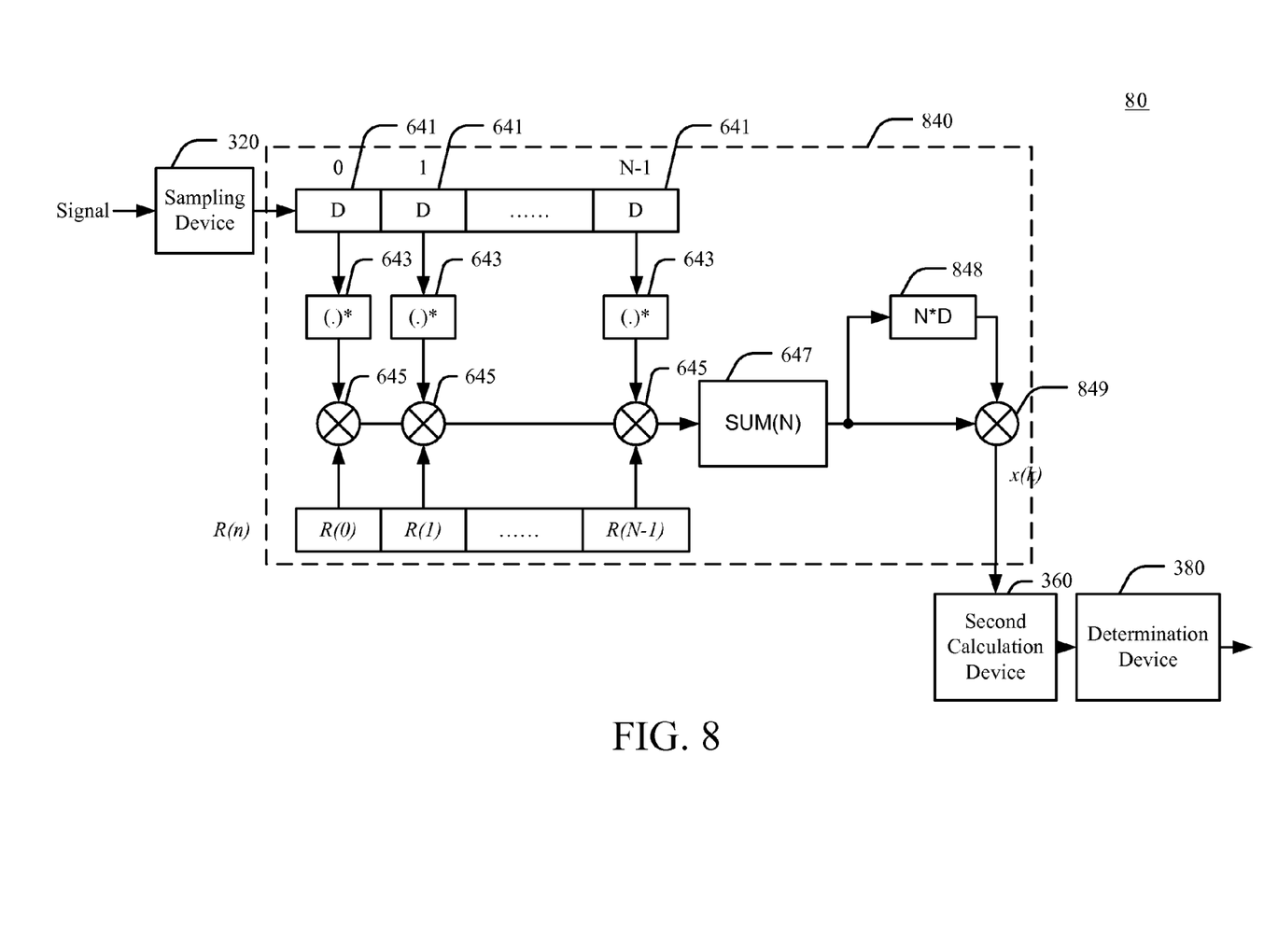
FIG. 8 is a block diagram of a signal processing device according to a fourth embodiment of the present invention.

FIG. 8 is a block diagram of a signal processing apparatus 80 according to a fourth embodiment of the present invention. The apparatus 80 comprises the sampling device 320, a first calculating device 840, the second calculation device 360 and the determination device 380. The first calculating device 840 comprises delay units 641, conjugation units 643, multiplication units 645, accumulation unit 647, a delayer 848 and a multiplication unit 849. Only the delayer 848 and the multiplication unit 849 in the first calculating device 840 are different from the above description and the details are described below. The rest of the signal processing apparatus components, including sampling device 320, the delay units 641 in the first calculating device 840, the conjugation units 643, the multiplication units 645, the accumulation unit 647, the second calculation device 360 and the determination 380 are similar to the above description, and is abridged herein.

The delayer 848 delays values $$\sum_{i=0}^{N-1} r^*(n+i)R(n+i)$$

to generate delayed values $$\sum_{i=0}^{N-1} r^*(n+N+i)R(n+N+i).$$

The multiplication unit 849 multiplies $$\sum_{i=0}^{N-1} r^*(n+i)R(n+i) \text{ and } \sum_{i=0}^{N-1} r^*(n+N+i)R(n+N+i)$$

to generate values $$x(k) = \left(\sum_{i=0}^{N-1} r^*(n+i)R(n+i)\right)\left(\sum_{i=0}^{N-1} r^*(n+N+i)R(n+N+i)\right).$$

Figure 9:
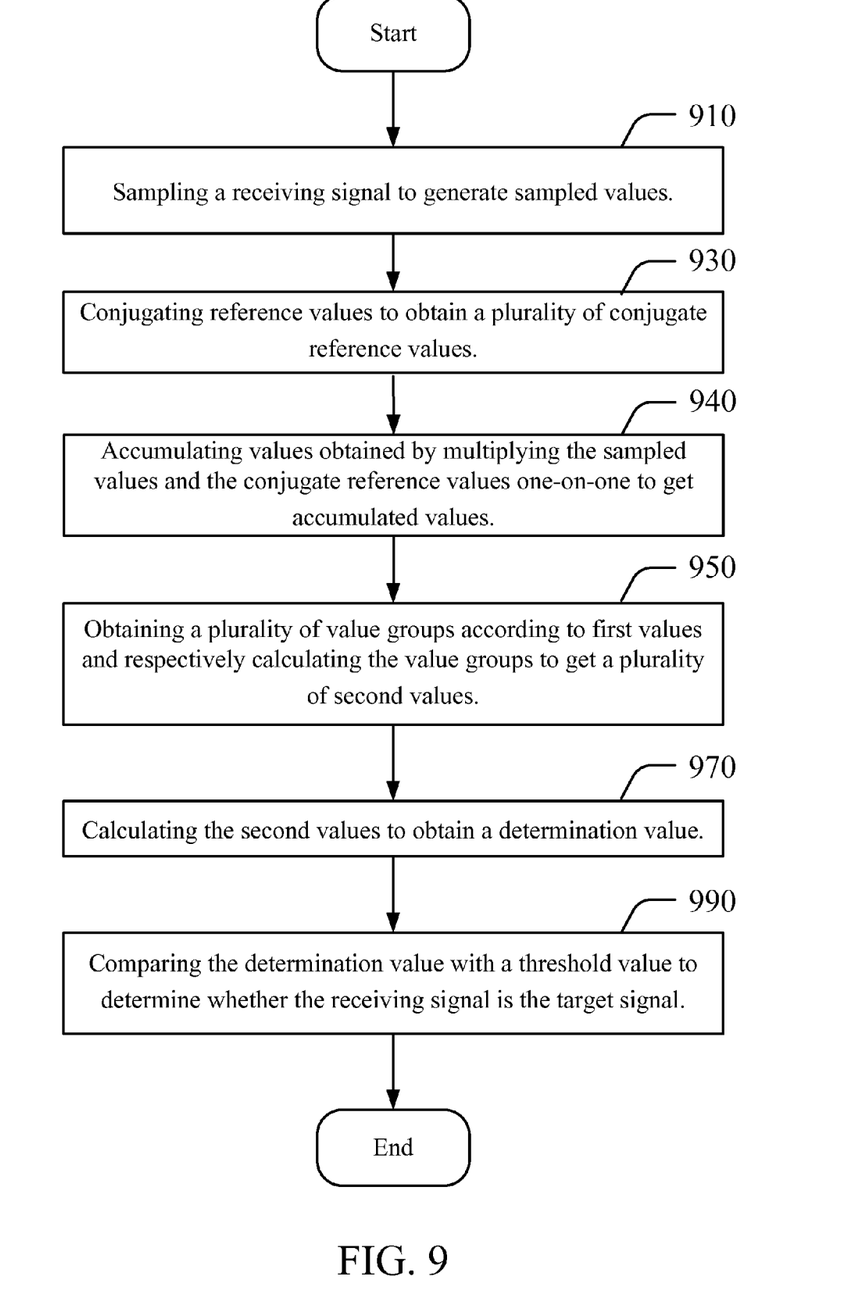
FIG. 9 is a flowchart of a signal processing method according to one embodiment of the present invention.

FIG. 9 is a flowchart of a signal processing method according to one embodiment of the present invention. In step 910, the sampling device 320 samples the receiving signal to generate sampled values, and the delay units 341 delay the sampled values to get delayed sampled values r(n), r(n+1), . . . , and r(n+N−1). In Step 930, the conjugation units 343 conjugate the reference values R(n) to obtain a plurality of conjugate reference values R*(n), R*(n+1), . . . , and R*(n+N−1). Then, the multiplication units 345 multiply the sampled values r(n), r(n+1), . . . , and r(n+N−1) and the conjugate reference values R*(n), R*(n+1), . . . , and R*(n+N−1) one-to-one to obtain a plurality of values r(n)R*(n), r(n+1)R*(n+1), . . . , and r(n+N−1)R*(n+N−1). In Step 940, the accumulation unit 347 accumulates such values to get values $$\sum_{i=0}^{N-1} r(n+i)R^*(n+i).$$

Finally, by the absolute value calculation unit 349 or by the combination of the delayer 748 and the multiplication unit 749, the values is operated to get the values x(k). Wherein, at a specific time, the values $$\sum_{i=0}^{N-1} r(n+i)R^*(n+i)$$

and x(k) both have only one value; however, through a period of time, the values $$\sum_{i=0}^{N-1} r(n+i)R^*(n+i)$$

and x(k) both have multiple values.

In Step 950, the second calculation device 360 obtains a plurality of value groups according to the values x(k) and respectively calculates the value groups to get a plurality of the values A and B or more. For example, the second calculation device 360 delays the values x(k) to obtain a plurality of delayed values, such as $$\sum_{i=0}^{N-1} r(n+N+i)R^*(n+N+i) \text{ or } \sum_{i=0}^{N-1} r^*(n+N+i)R(n+N+i).$$

Then, the delayed values are separated into a plurality of value groups, such as two value groups. And, all delayed values within each value groups are accumulated to obtain values, such as $$A = \sum_{i=4}^{11} x(k+i) \text{ and } B = \sum_{i=0}^{3} x(k+i) + \sum_{i=12}^{15} x(k+1),$$

$$A = \sum_{i=0}^{7} x(k+i) \text{ and } B = \sum_{i=8}^{15} x(k+i),$$

$$A = \sum_{i=8}^{15} x(k+1) \text{ and } B = \sum_{i=0}^{7} x(k+1),$$

$$A = \sum_{i=6}^{15} x(k+1) \text{ and } B = \sum_{i=0}^{9} x(k+1), \text{ or}$$

$$A = \sum_{i=9}^{14} x(k+1) \text{ and } B = \sum_{i=1}^{6} x(k+1).$$

In Step 970, the second calculation device 360 uses the values A and B or more to obtain a determination value, such as A/B. In Step 990, the determination device 380 compares the determination value with a threshold value to determine whether the receiving signal is the target signal.

From the above, the present invention discloses a signal processing apparatus and method thereof for determining whether a receiving signal is a target signal more correctly. The problem of the noise interference in signal transmission or the distances between the receiving end and the transmitting end incurring differentiation in strengths of the receiving signals can be resolved by dividing the delayed values x(k) into a plurality of value groups and dividing them. Consequently, the calculated determination value can reduce the errors in determining, and eliminates the problems in the prior art that the non-target signal is erroneously determined to be the target signal owing to the excessive value of signal strength, or the target signal is omitted because the signal strength is too small.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A signal processing apparatus for determining whether a receiving signal is a target signal comprising:
   a sampling device for sampling the receiving signal to generate a plurality of sampled values;
   a first calculation device, coupled to the sampling device, for generating a plurality of first values according to the sampled values and a plurality of reference values;
   a second calculation device, coupled to the first calculation device, for grouping the first values into a plurality of value groups, respectively calculating the value groups to generate a plurality of second values and generating a determination value using the second values; and
   a determination device, coupled to the second calculation device, for determining whether the receiving signal is the target signal by comparing the determination value with a threshold value;
   wherein the first calculation device comprises:
      a plurality of first delay units, coupled to the sampling device, for delaying the sampled values;
      a plurality of conjugation units, for conjugating the reference values to generate a plurality of conjugate reference values;
      a plurality of first multiplication units, coupled to the delay units and the conjugation units, for multiplying the sampled values and the conjugate reference values one-to-one to generate a plurality of third values;
      an accumulation unit, coupled to the multiplication units, for accumulating the third values to generate a plurality of fourth values; and
      a further calculation unit, coupled to the accumulation unit and the second calculation device, for further performing calculation to the fourth values to generate the first values, comprising:
         a second delay unit, coupled to the accumulation unit, for delaying the fourth values to generate a plurality of delayed fourth values; and
         a second multiplication unit, coupled to the accumulation unit, the second delay unit, and the second calculating device, generating the first values by multiplying the fourth values and the delayed fourth values;
   wherein the second calculating device comprises:
      a plurality of delay units, coupled to the first calculation device, for delaying the first values to generate a plurality of delayed first values;
      a plurality of adding units, coupled to the delay units, for accumulating parts of the delayed first values, respectively, to generate the second values, and the delayed first values accumulated by each adding unit constituting one of the value groups; and
      a calculation unit, coupled to the adding units, for calculating the second values to generate the determination value.

2. The apparatus according to claim 1, wherein at least two of the value groups comprise an identical delayed first value.

3. The apparatus according to claim 1, wherein the quantity of the plurality of adding units is two and the calculation unit divides one of the two second values by the other to generate the determination value.

4. The apparatus according to claim 3, wherein the two value groups comprise at least one identical delayed first value.

5. The apparatus according to claim 3, wherein the further calculation unit is an absolute value calculation unit, for obtaining absolute values of the fourth values to generate the first values.

6. A signal processing apparatus for determining whether a receiving signal is a target signal comprising:
    a sampling device for sampling the receiving signal to generate a plurality of sampled values;
    a first calculation device, coupled to the sampling device, for generating plurality of first values according to the sampled values and a plurality of reference values;
    a second calculation device, coupled to the first calculation device, for grouping the first values into a plurality of value groups, respectively calculating the value groups to generate a plurality of second values and generating determination value using the second values; and
    a determination device, coupled to the second calculation device, for determining whether the receiving signal is the target signal by comparing the determination value with a threshold value;
    wherein the first calculation device comprises:
        a plurality of first delay units, coupled to the sampling device, for delaying the sampled values;
        a plurality of conjugation units, for conjugating the sampled values to generate a plurality of conjugate sampled values;
        a plurality of first multiplication units, coupled to the conjugation units, for multiplying the conjugate sampled values and the reference values one-to-one to generate a plurality of third values;
        an accumulation unit, coupled to the multiplication units, for accumulating the third values to generate a plurality of fourth values; and
        a further calculation unit, coupled to the accumulation unit and the second calculation device, for further performing calculation to the fourth values to generate the first values;
    wherein the second calculating device comprises:
        a plurality of delay units, coupled to the first calculation device, for delaying the first values to generate a plurality of delayed first values;
        a plurality of adding units, coupled to the delay units, for accumulating parts of the delayed first values, respectively, to generate the second values, and the delayed first values accumulated by each adding unit constituting one of the value groups; and
        a calculation unit, coupled to the adding units, for calculating the second values to generate the determination value.

7. The apparatus according to claim 6, wherein the further calculation unit is an absolute value calculation unit, for obtaining absolute values of the fourth values to generate the first values.

8. A signal processing method performed by a signal processing apparatus for determining whether a receiving signal is a target signal, the method comprising:
    sampling the receiving signal to obtain a plurality of sampled values;
    obtaining a plurality of first values according to the sampled values and a plurality of reference values;
    grouping the first values into a plurality of value groups, and
    respectively calculating the value groups to generate a plurality of second values;
    generating a determination value by using the second values; and
    determining whether the receiving signal is the target signal by comparing the determination value with a threshold value;
    wherein grouping the first values into the plurality of value groups, and respectively calculating the value groups to generate the plurality of second values comprises:
        delaying the first values to generate a plurality of delayed first values; and
        accumulating a part of the delayed first values to generate the second values;
        wherein the delayed first values constitutes one of the value groups;
    wherein the step of obtaining a plurality of first values according to the sampled values and a plurality of reference values comprises:
        delaying the sampled values;
        conjugating the reference values to obtain a plurality of conjugate reference values;
        multiplying the sampled values and the conjugate reference values one-to-one to obtain a plurality of third values;
        accumulating the third values to obtain a plurality of fourth values; and
        calculating the fourth values to generate the first values, comprising:
            delaying the fourth values to obtain a plurality of delayed fourth values; and
            multiplying the fourth values and the delayed fourth values to generate the first values.

9. The method according to claim 8, wherein at least two of the value groups comprise an identical delayed first value.

10. The method according to claim 8, wherein the quantity of the plurality of the second values is two and one of the two second values is divided by the other to generate the determination value.

11. The method according to claim 10, wherein the two value groups comprises at least one same delayed first value.

12. The method according to claim 8, wherein the step of calculating the fourth values to generate the first values is to obtain absolute values of the fourth values to generate the first values.

13. A signal processing method performed by a signal processing apparatus for determining whether a receiving signal is a target signal, the method comprising:
    sampling the receiving signal to obtain a plurality of sampled values;
    obtaining a plurality of first values according to the sampled values and a plurality of reference values;
    grouping the first values into a plurality of value groups, and
    respectively calculating the value groups to generate a plurality of second values;
    generating a determination value by using the second values; and
    determining whether the receiving signal is the target signal by comparing the determination value with a threshold value;
    wherein grouping the first values into the plurality of value groups, and respectively calculating the value groups to generate the plurality of second values comprises:

delaying the first values to generate a plurality of delayed first values; and accumulating a part of the delayed first values to generate the second values;

wherein the delayed first values constitutes one of the value groups;

wherein the step of obtaining a plurality of first values according to the sampled values and a plurality of reference values comprises:

delaying the sampled values;

conjugating the reference values to obtain a plurality of conjugate reference values;

multiplying the sampled values and the conjugate reference values one-to-one to obtain a plurality of third values;

accumulating the third values to obtain a plurality of fourth values;

delaying the fourth values to obtain a plurality of delayed fourth values;

and calculating the fourth values to generate the first values.

14. The method according to claim 13, wherein the step of calculating the fourth values to generate the first values is to obtain absolute values of the fourth values to generate the first values.

15. The method according to claim 13, wherein the step of calculating the fourth values further comprises:

multiplying the fourth values and the delayed fourth values to obtain the first values.

* * * * *